UNITED STATES PATENT OFFICE.

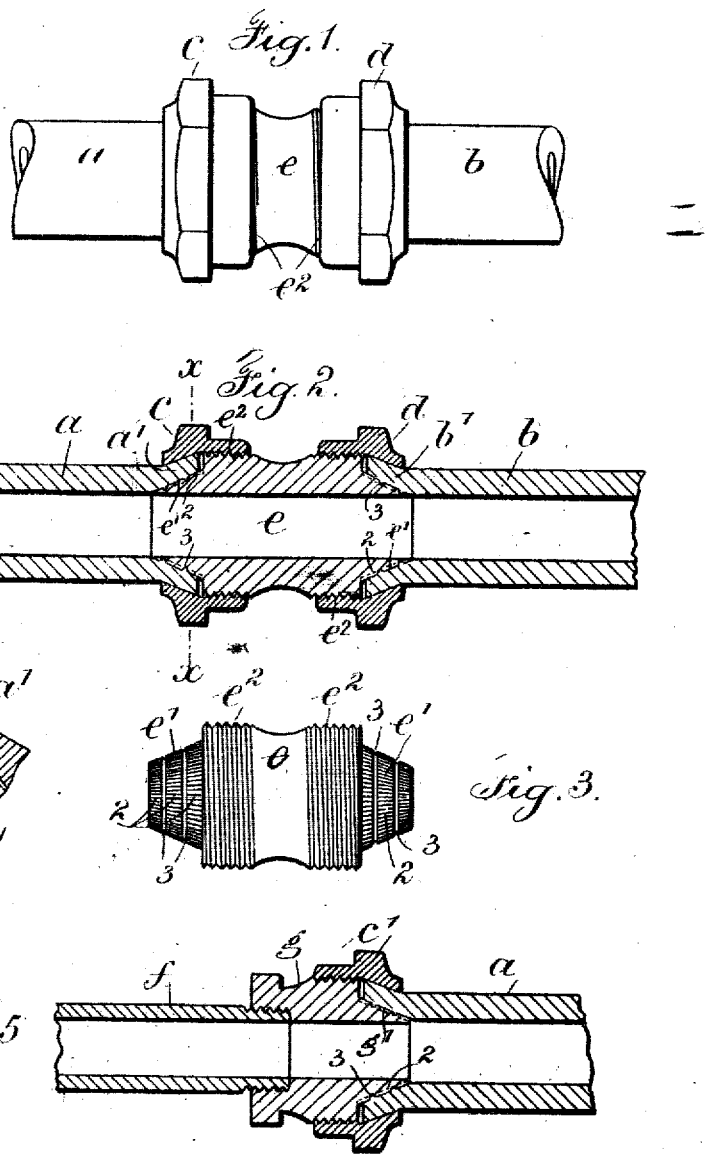

HERBERT J. WILKS AND MAXIMILIAN KLAIBER, OF NEW YORK, N. Y. ASSIGNORS TO MODERN IMPROVEMENTS MFG. CO., OF BROOKLYN, NEW YORK, A CORPORATION OF NEW YORK.

COUPLING FOR PIPES AND TUBES.

No. 821,564.  Specification of Letters Patent.  Patented May 22, 1906.

Application filed September 13, 1905. Serial No. 278,224.

*To all whom it may concern:*

Be it known that we, HERBERT J. WILKS and MAXIMILIAN KLAIBER, citizens of the United States, residing at the borough of Brooklyn, in the county of Kings, city and State of New York, have invented an Improvement in Couplings for Pipes and Tubes, of which the following is a specification.

Our invention relates to devices for connecting the meeting ends of pipes and tubes, especially such lead pipes or lead and iron pipes as are used in the plumbing art.

As is well known in this art, the usual manner of connecting the adjacent ends, especially of lead pipe, is by a wiped or soldered joint. This joint is clumsy, expensive, and more or less unsightly. Metal coupling devices have heretofore been employed for connecting the meeting ends of pipes, the same comprising a thimble with a conical end to pass into the spread end of a pipe and a nut surrounding the pipe and screwing upon the thimble. Sometimes the thimble has been double-ended to pass into the adjacent spreads ends of the pipes to be connected, and two nuts have been employed screwing upon the surface of the thimble outside of the ends of the pipe; but in these cases the movable member—that is, the nut—had the larger bearing-surface, and as the same was roated to clamp the pipe tightly to the thimble the tendency of the larger movable area was to twist the pipe, and frequently pipes were thus very badly twisted, making the joint not only unsightly, but unreliable; and the object of our invention is to provide a metal coupling for the adjacent ends of pipes where this difficulty shall not be present.

In the device of our invention the conical surface of the thimble to enter the flared end of the pipe is roughened, so as to grip the pipe and prevent the same being turned around the thimble by the turning of the nut. In roughening this surface we prefer to longitudinally or axially score the surface, so as to produce alternate ribs and grooves in the form of teeth and to also form two circumferential grooves intersecting these longitudinal teeth and grooves, the circumferential grooves being formed to the base of the other grooves, and we also prefer to polish the inner surface of the nuts where they bear against the flared outer surface of the pipe. This polishing of the inner surface permits the nut to turn freely over the surface, and the scoring and grooving of the surface of the tapering end of the thimble causes the lead of the pipes to be forced into both the axial or longitudinal grooves and the circumferential grooves, not only to prevent the pipe slipping, but to form a liquid-tight joint.

In the drawings, Figure 1 is an elevation representing the device of our improvement. Fig. 2 is a longitudinal section of the same. Fig. 3 is an elevation of the thimble alone. Fig. 4 is a transverse section at $x\ x$ of Fig. 2 in larger size, and Fig. 5 is a longitudinal section illustrating a modified form of the invention.

Referring now to Figs. 1 to 4, inclusive, $a\ b$ are the two adjacent ends of lead pipe which are to be connected by the metal coupling. These are provided with flaring ends $a'\ b'$, which are made in the well-known manner in this art by a tool inserted in the end of the pipe. Before the flaring is done, however, the metal nuts $c\ d$ are slipped over the ends of the pipes. After the ends are flared the thimble $e$, with tapering or beveled ends, is passed into the flared ends of the pipes and the nuts $c\ d$ brought up to position.

Referring to Fig. 3, which shows the thimble $e$ alone, $e'$ represents the frusto-conical or beveled ends; $e^2$, the threaded cylindrical peripheries. $2$ represents the longitudinal and axial teeth and grooves of the conical ends $e'$, and $3$ the circumferential grooves cut therein preferably to the base of the grooves between the teeth or ribs $2$. As the nuts $c\ d$ are screwed to place the lead of the ends of the pipes is not only forced into the grooves between the ribs or teeth $2$, but is also forced into the circumferential grooves $3$, the inner surfaces of the nuts $c\ d$, bearing against the ends of the pipes $a\ b$, being preferably polished. Because the lead is forced into the irregular surfaces of the ends of the thimble, causing the inner surface of the lead pipe to have a reverse configuration to the ends of the thimble, an interlocked condition is established, which prevents the turning or twisting of the lead pipe by the sleeves or nuts $c\ d$ as they are screwed to place, thus preserving the continuity of surface of the lead pipe without distortion. Furthermore, the annular grooves $3$ in the tapering ends of the thimble form ribs of the soft metal of the lead pipe forced into them, which make a liquid-tight joint—so tight that experiment has proved it to be impossible for the liquid under any reasonable pressure to be forced by said parts.

Fig. 3, illustrating a modified form of our invention, shows the connection of one end of a lead pipe to one end of an iron pipe, $a$ representing the lead pipe, and $f$ the iron pipe, which iron pipe is threaded at its end to screw into an interiorly-threaded portion of the sleeve $g$, the sleeve $g$, as a thimble, at one end being tapered at $g'$, as hereinbefore described with reference to the thimble $e$, and also provided with ribs 2 and intervening grooves and the circumferential grooves 3 to pass into the flared end of the lead pipe, the nut $c'$ screwing onto the sleeve $g$ and binding the lead pipe to the sleeve in a manner similar to that hereinbefore described with reference to the parts, Figs. 1 to 4, inclusive.

We claim as our invention—

1. In a coupling, the combination with a thimble and means for connecting thereto a pipe at one end, of a tapering or beveled end to said thimble, the surface of which is provided with axial or longitudinal teeth and grooves to be passed into the adjacent flared end of the pipe to be connected, and a sleeve or nut surrounding the end of the latter pipe and screwing upon the surface of the thimble.

2. In a coupling, the combination with a thimble and means for connecting thereto a pipe at one end, of a tapering or beveled end to said thimble, the surface of which is provided with axial or longitudinal teeth and grooves, and circumferential grooves intersecting the longitudinal teeth and grooves, to be passed into the adjacent flared end of the pipe to be connected, and a sleeve or nut surrounding the end of the latter pipe and screwing upon the surface of the thimble.

3. In a coupling, the combination with adjacent flared ends of pipes to be connected, of a thimble having tapering or beveled ends to pass into said flared ends, said thimble having screw-threaded exterior portions and the tapering or beveled ends with longitudinal or axial teeth and grooves, and sleeves or nuts surrounding the flared ends of said pipes and screwing upon the threaded surfaces of said thimble in connecting the parts.

4. In a coupling, the combination with adjacent flared ends of pipes to be connected, of a thimble having tapering or beveled ends to pass into said flared ends, said thimble having screw-threaded exterior portions and the tapering or beveled ends with longitudinal or axial teeth and grooves, and circumferential grooves intersecting the longitudinal teeth and the grooves, and sleeves or nuts surrounding the flared ends of said pipes and screwing upon the threaded surfaces of said thimble in connecting the parts.

Signed by us this 28th day of August, 1905.

HERBERT J. WILKS.
MAXIMILIAN KLAIBER.

Witnesses:
A. H. SERRELL,
S. T. HAVILAND.